United States Patent
Jannink

(10) Patent No.: US 7,268,791 B1
(45) Date of Patent: Sep. 11, 2007

(54) SYSTEMS AND METHODS FOR VISUALIZATION OF DATA SETS CONTAINING INTERRELATED OBJECTS

(75) Inventor: Jan F. Jannink, Menlo Park, CA (US)

(73) Assignee: Napster, Inc., San Jose, CA (US)

( * ) Notice: Subject to any disclaimer, the term of this patent is extended or adjusted under 35 U.S.C. 154(b) by 257 days.

(21) Appl. No.: 09/698,195

(22) Filed: Oct. 30, 2000

Related U.S. Application Data

(60) Provisional application No. 60/162,465, filed on Oct. 29, 1999.

(51) Int. Cl.
- G09G 5/02 (2006.01)
- G06T 11/20 (2006.01)
- G06F 7/00 (2006.01)
- G06F 17/30 (2006.01)

(52) U.S. Cl. .......................... 345/619; 345/440; 707/3; 707/4; 707/5; 707/206

(58) Field of Classification Search ................ 345/619, 345/440; 707/3–5, 206, 531, 2
See application file for complete search history.

(56) References Cited

U.S. PATENT DOCUMENTS

| | | | |
|---|---|---|---|
| 4,905,163 A | | 2/1990 | Garber et al. |
| 5,946,678 A * | | 8/1999 | Aalbersberg ............... 707/3 |
| 6,173,287 B1 * | | 1/2001 | Eberman et al. ............ 707/102 |
| 6,272,507 B1 * | | 8/2001 | Pirolli et al. ................ 715/513 |
| 6,321,240 B1 * | | 11/2001 | Chilimbi et al. ............ 707/206 |
| 6,330,556 B1 * | | 12/2001 | Chilimbi et al. ............ 707/2 |
| 6,363,378 B1 * | | 3/2002 | Conklin et al. ............. 707/5 |
| 6,366,910 B1 * | | 4/2002 | Rajaraman et al. ......... 707/5 |
| 6,374,241 B1 * | | 4/2002 | Lamburt et al. ............ 707/6 |
| 6,434,550 B1 * | | 8/2002 | Warner et al. .............. 707/3 |
| 6,434,556 B1 * | | 8/2002 | Levin et al. ................ 707/5 |
| 6,480,843 B2 * | | 11/2002 | Li ............................... 707/5 |
| 6,484,164 B1 * | | 11/2002 | Nikolovska et al. ........ 707/3 |

FOREIGN PATENT DOCUMENTS

EP 0860786 8/1998

OTHER PUBLICATIONS

Savoy, J., "*Ranking Schemes in Hybrid Boolean Systems: A New Approach*," Journal of the American Society for Information Science, American Society for Information, Washington, U.S. vol. 48, No. 3, Mar. 1, 1997, pp. 235-253.

* cited by examiner

*Primary Examiner*—Jin-Cheng Wang
(74) *Attorney, Agent, or Firm*—Martine Penilla & Gencarella, LLP

(57) ABSTRACT

A visualization of a set of related data items is accomplished by ranking a plurality of secondary data items with respect to their relationship to a principal data item. The set of related data items may be stored in any form, including, for example, as a relational database, an object database, or an XML document. The related items display names can be formatted and ranked according to the properties of the item, so as to avoid duplication and information overload for the user. The ranked data can be displayed along curved segments in a graphical chart, so as to allow convenient visualization of the data and the data's relationship to the principal item that may be prominently displayed at the center of the chart.

1 Claim, 8 Drawing Sheets

SYSTEMS AND METHODS FOR VISUALIZATION OF DATA SETS CONTAINING INTERRELATED OBJECTS

RELATED APPLICATIONS

The present application claims priority to Provisional Application No. 60/162,465 filed Oct. 29, 1999. The present application also relates to co-pending U.S. application Ser. No. 09/574,108, filed May 19, 2000. Each of the above referenced applications is incorporated herein by reference in its entirety.

BACKGROUND

1. Field of the Invention

The present invention relates to visualization systems and methods and more particularly to systems and methods for enabling visualization of data sets containing large numbers of objects.

2. Description of the Related Art

U.S. Pat. No. 5,966,139, granted to Anupam et al. and assigned to Lucent Technologies Inc., relates to scalable data segmentation and visualization. In particular, the '139 patent describes visualization of relatively large amounts of data in a limited display space, including segmentation of data, mapping of segments to a node within a display space based upon a specified nodal layout, texture mapping each graphical display to its node, and displaying the data at each node. The visualization scheme enables a user to map a relation to a specification of an n-dimensional display, by designating how attributes are to be used.

However, the visualization system of the '139 patent fail to represent data sets having two properties, namely that subsets of items in a data set relate to each other, and the relationships between items have an affinity value associated with each other. Furthermore, a system according to the '139 patent does not simplify the display of data to the user by presenting multiple screens of only the amount of data that can be comfortably fit on a screen.

SUMMARY OF THE INVENTION

The present invention discloses methods and systems for the visualization of data sets containing a large number of interrelated objects (or items) from data sets having two properties, namely that subsets of items in a data set relate to each other, and the relationships between items have a value associated with each other. In particular, according to an embodiment of the present invention, a compact, easily understood, and easily navigable visual representation of objects in a data set can be achieved.

As a preparatory step, local rankings of the relationships between items are established, by ranking the items i that relate to each item j, and ranking all items k to which item j relates, thereby ranking the affinity to each item j of item sets i and k. Next according to an embodiment of the present invention, a visualization can be generated, by presenting results separately for each item in a predetermined data set and adjusting the presentation to avoid information overlap and overload. Separate representation of each item of the data set can be accomplished by generating an affinity chart for each item j in the data set, to display items closely related to selected item j, with item j being placed prominently in the affinity chart, and placing items which are more strongly related to item j closer to item j. Further, closeness is expressed along curves of shaped segments which may be completely or partially straight, which are connected or which are emanating from item j's position.

According to one embodiment of the present invention, continuous curves including but not limited to spiral segments, are employed to connect items relating to item j at different intensity levels. To adjust the visualization to avoid information overlap and overload, the items related to a particular item j are grouped by strength of affinity. Each related item is individually spaced on the affinity chart, with each item being placed in a non-overlapping position. Items with large numbers of related items are presented with multiple affinity charts. In the case of multiple affinity charts, a first affinity chart visualizes a set of most strongly related items. Next or subsequent related affinity charts visualize less strongly related items. According to an embodiment, curves can be used to represent the relationship of items related to a particular item positioned at a starting point for the curve. Distance along the affinity curve represents the strength of the affinity to the item at the starting point of the curve. Color and shading gradations and curve thickness gradations are selectively employed to emphasize the curve's role in conveying affinity strength. Items are placed so they do not overlap or crowd each other. Arbitrarily large data sets are visualized using low and localized computational resources.

DETAILED DESCRIPTION

Visualization of a data set refers to the use of various techniques to convey the overall structure of information by visual means. In particular, visual cues can be used to represent relations between objects. Visual cues can include, for example, using segments of a curve to represent the affinity (or strength) of the relationship between objects, and using gradations of the width and color of the curves to represent the intensity of the affinity relationships between the objects.

Figure 1:
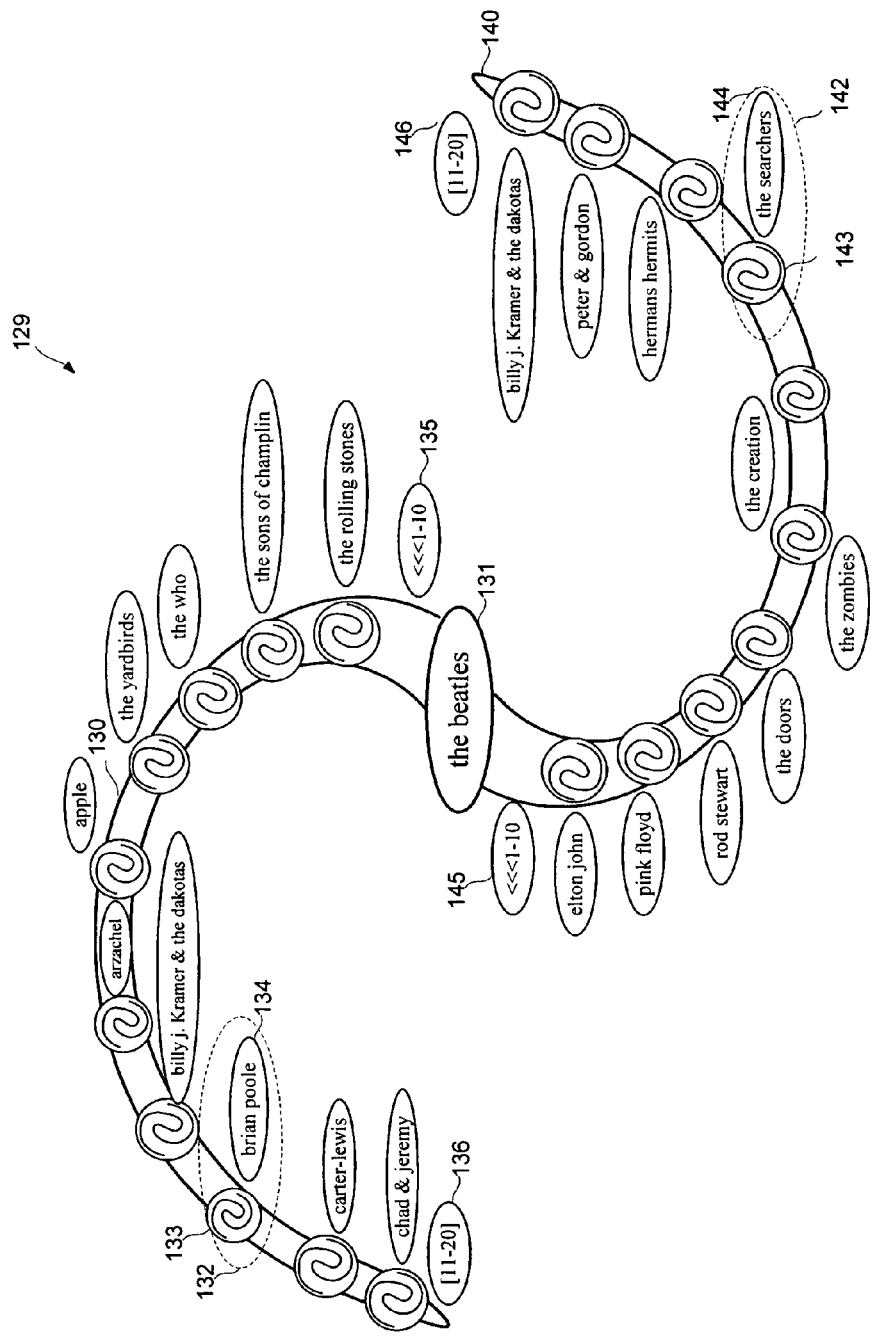
FIG. 1 is an affinity chart according to an embodiment of the present invention.

Referring now to FIG. 1, there is shown a diagram of most closely related items according to the present invention. In particular, FIG. 1 shows an affinity chart 129 including first and second affinity curves 130 and 140 including a principal item 131 and first and second pluralities of related items 132 and 142. Each related item 132, 142 includes a navigational link 133, 143 respectively and a search link 134, 144 respectively. Adjacent to the principal item 131 and at one end of a selected strings of related items 132 and 142 are respective first sequence element 135 and 145, and adjacent to a last item of the selected strings of related items 132, 142 is a second sequence element 136, 146 which provides a link to a supplementary affinity chart for more remotely relevant strings of related items 132, 142.

In an embodiment, the affinity chart 129 may consist of a single list of textual or graphical items and associated links. The principal item 131, related items 132 and 142, first sequence elements 135, 145, and second sequence elements 136, 146 may all appear as items of the list. In this list, each related item may appear associated with a navigational link 133, 143, and a search link 134, 144. Such an affinity chart may be required when the display in which it is presented only accommodates lists.

Figure 2:
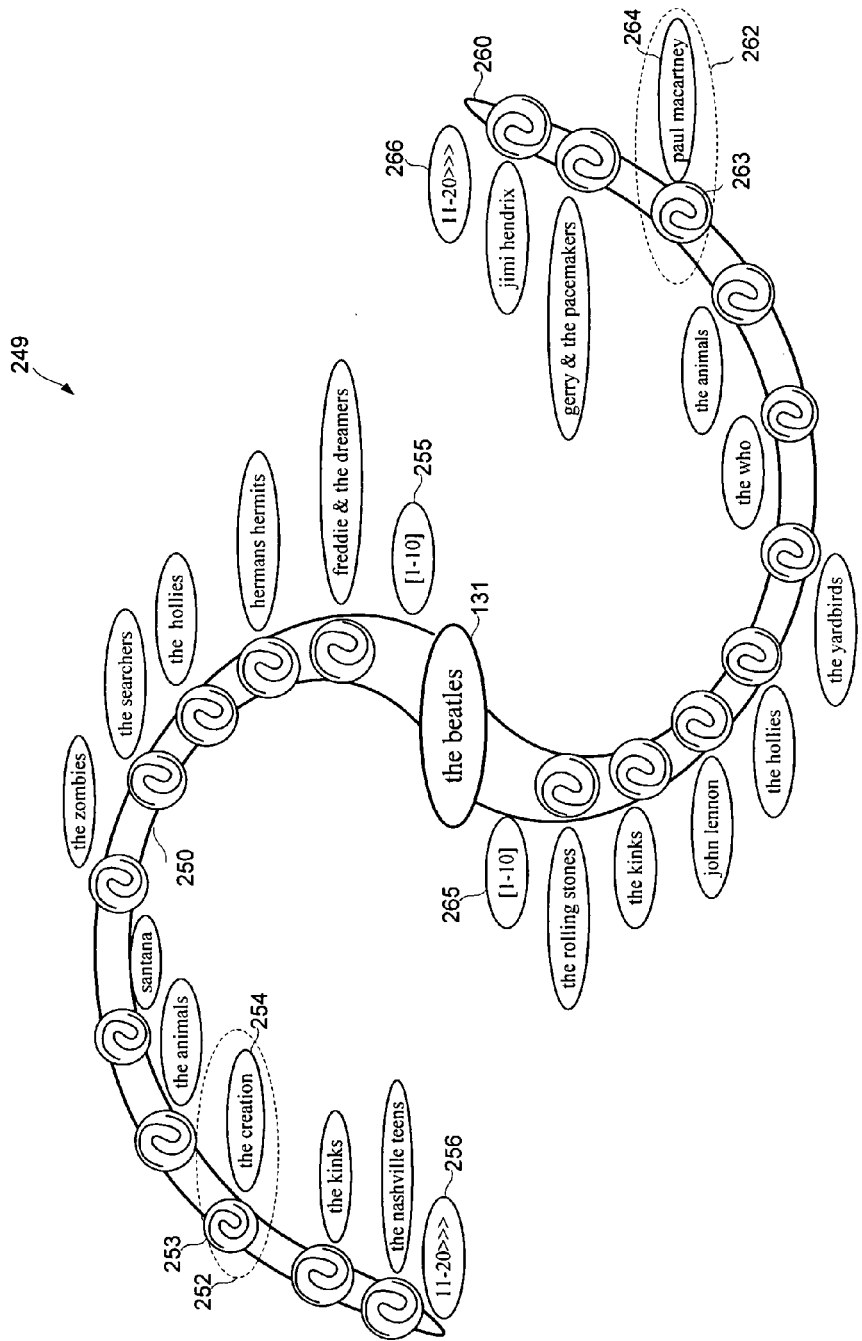
FIG. 2 is an affinity chart of other related items for the affinity chart of FIG. 1.

Referring now to FIG. 2, there is shown a diagram of other lesser related items to principal item 131 than those shown in FIG. 1, according to the present invention. In particular, FIG. 2 shows an affinity chart 249 representing those items that would have been reached as a result of selecting first sequence element 135 in FIG. 1. Affinity chart 249 in FIG. 2 includes first and second affinity curves 250 and 260 including a principal item 131 and first and second pluralities of related items 252 and 262 that are lesser related to principal item 131 than related items 132 and 142 shown in FIG. 1. Each related item 252, 262 includes a navigational link 253, 263 respectively and a search link 254, 264 respectively. Adjacent to the principal item 131 and at one end of a selected strings of related items 252 and 262 are respective first sequence elements 255 and 265, which provide a link to the affinity chart of more strongly related items, and adjacent to a last item of the selected strings of related items 252, 262 is a second sequence element 256, 266 which provides a link to a supplementary affinity chart for more remotely relevant strings of related items 252, 262. By selecting the first sequence element 255 or 265, the user can navigate to reach the affinity curves 240 or 250 to view a string of relevant items as shown in FIG. 1.

Figure 3:
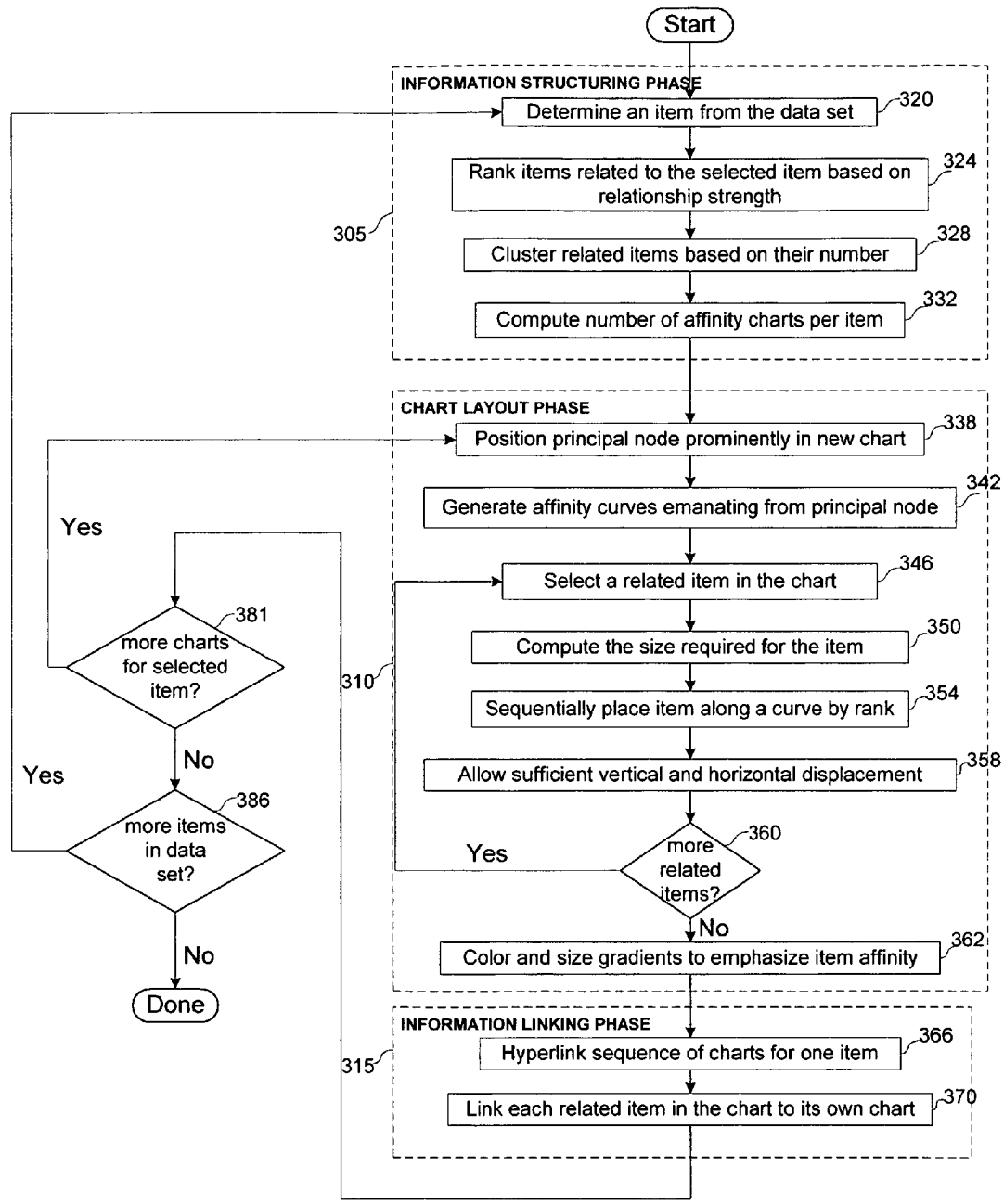
FIG. 3 is a flowchart illustrating one method of visualizing large interrelated data sets.

FIG. 3 is a flow chart depicting a method for visualization of large interrelated data sets, according to the present invention. According to this method, the visualization of data sets containing a large number of items from data sets having two properties, namely that subsets of items in a data set relate to each other, and the relationships between items have a value associated with each other, is enabled.

In an embodiment of the invention, a method of visualization of large interrelated data sets can include an information structuring phase 305, a chart layout phase 310, and an information linking phase 315. In information structuring phase 305, the relationships between objects in a data set and the intensity of those relationships can be computed. As a preparatory step in the information structuring phase, an item from the data set can be selected in step 320. Local rankings of the relationships between items can be established in step 324, by ranking for each selected item j the items i that relate to that item j, and then ranking all items k to which item j relates, thereby ranking the affinity for each item j to item sets i and k. As a result, the rankings of the related items are relative (or local) to item j, but are not a universal measurement of the importance of the item. To determine how an item relates to another item, the strength of the relationship between the items can be computed using any combination of objective or subjective criteria, or a combination of both. A value can be associated with each criterion, and a plurality of these values can be reduced to a single value (i.e. an affinity value), by, for example, adding them all together and then normalizing the value.

Referring back to FIG. 1, principal node 131 ("The Beatles") would have item set i and item set k related to it. Spiral curve 130 depicts item set i (i.e. those items that are related to principal node 131), while spiral curve 140 depicts item set k (i.e. those items to which principal node 131 relates). To determine both item set i and item set k in FIG. 1, both objective and subjective criteria related to The Beatles could be used. Objective criteria used to determine the relationships between various musical bands could include, for example, the era in which the band played (e.g. 1960s), and the genre of the music (e.g. rock, British Invasion, pop). Subjective criteria could include, for example, how well liked the band is based on feedback from users, and how often two bands appear together in radio station play lists.

In an embodiment, a single affinity value can be determined from the various criteria to represent the strength of the relationship between objects, and the related items to the selected item can be ranked in step 324 by the affinity values associated with each related item. Once ranked, those related items can be clustered in step 328. Clustering refers to the process of appropriately grouping the ranked objects. For example, an arbitrary number (e.g. ten) of the most closely related items can be chosen as a cluster. Once clustered, the number of affinity charts can be computed in step 332. Thus, using the above example, if twenty-eight related items exist, step 332 can result in a computation of three affinity charts needing to be generated, two of which would have ten items and the third having eight items. The first ten would be the most closely related to the principal item, the next ten would be the next most closely related, and the last eight would be the next most closely related.

Next in an embodiment of the invention, chart layout phase 310 can cause the organization and placement of the relevant subsets of the objects in charts or graphs that can be used to display the relationships between the objects. The complete set of charts constitutes a virtual map of the data set.

Chart layout phase 310 can begin by positioning the selected item as a principal node in a chart in step 338. This can include the placement of a hyperlink for the selected item in a specified position of the chart. Next a visualization can be generated, by presenting results separately for each item in a predetermined data set and adjusting the presentation to avoid information overlap and overload. In an embodiment, separate presentation for each item of the data set can be accomplished by generating an affinity curve in step 342 for each item j in the data set, to display items closely related to selected item j, with item j being placed prominently in the affinity chart, and placing items which are more strongly related to j closer to j. Further, closeness can be expressed along curves or shaped segments which may be completely or partially straight, and which may be connected or may emanate from j's position.

According to an embodiment of the present invention, continuous curves including but not limited to spiral segments, can be employed to connect items relating to j at different intensity levels. In step 346, a related item can be selected and in step 350, the size required for that related item can be determined. In step 354, the related item can be individually spaced on the affinity chart by its rank, with each item being placed in a non-overlapping position by allowing sufficient vertical and horizontal displacement in step 358. A determination can be made in step 360 of whether any more related items need to be placed on the affinity curve. If so, control returns to step 346 where the next item is selected. If there are no more related items to process, the color and size gradients of the curve can be adjusted in step 362 to emphasize the affinity between the items.

A selected item with a large number of related items can be presented with multiple affinity charts. In the case of multiple affinity charts, a first affinity chart can be used to visualize a set of most strongly related items. Next or subsequent related affinity charts can be used to visualize less strongly related items.

According to an embodiment, arbitrarily large data sets can be visualized using low and local computational resources. During information linking phase 315, the sequence of affinity charts for a selected item can be hyperlinked in step 366. Each related item can then be linked to its own chart in step 370. Once the selected item and its associated affinity curves from the data set have been hyperlinked, navigation by the user can occur by the user clicking to connect to a selected related affinity chart. Further, as a result of information linking phase 315, each item may have separate features that can be activated by the user clicking on those features.

Upon completion of information linking phase 315, a determination can be made in step 381 of whether more charts need to be generated for the selected item. If so, control can pass to step 338 where the selected item can be placed in a new chart. If no further charts are needed for selected items, a determination can be made in step 386 of whether more items in the data set need charts generated for them. If so, control can pass to step 320 where a determination is made of a new selected item and the process repeats.

Figure 4:
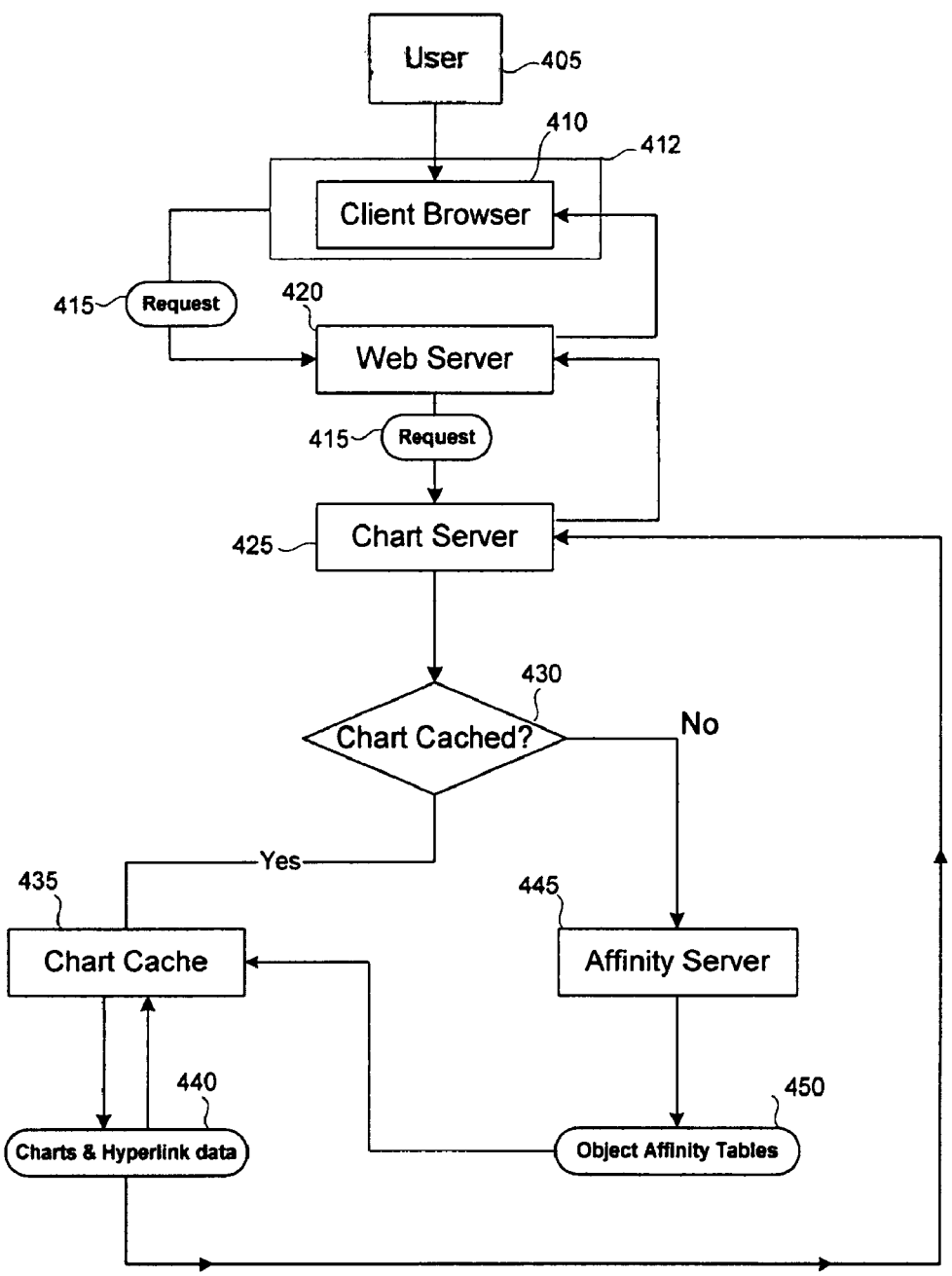
FIG. 4 is a data flow diagram showing the flow of data through a system for visualizing large interrelated data sets.

FIG. 4 is a data flow diagram showing the flow of data through a system for visualizing interrelated data sets, according to an embodiment of the present invention. In the system shown in FIG. 4, a user 405 of a computer 412 containing a client browser 410 (as is well known and understood in the art) can send a request 415 via a distributed computer network (such as the Internet) to a web server 420. Web server 420 can process the request and ultimately provide the interface for user 405, including the ability to navigate visualized data sets.

Upon receiving the request, web server 420 can process the request and send the request on to chart server 425. A determination can then be made in step 430 of whether the particular chart corresponding to the request had previously been cached. This could have occurred if a prior request had been made for the same data. If so, the necessary information can be provided from chart cache 435. By way of example only, the information could consist of charts and hyperlinked data 440.

If the particular chart corresponding to the request had not previously been cached, the request can be passed on to affinity server 445. Affinity server 445 can have available to it object affinity tables 450 that contain information regarding the items in the data set, including, for example, the fields detailed in the affinity tables shown in FIG. 6. After receiving a request, affinity server 445 can access object affinity tables 450 for the information needed to structure the chart corresponding to the request, according to information structuring phase 305 described with respect to FIG. 3.

After being retrieved from chart cache 435 or generated by affinity server 445, the charts and hyperlinked data 440 can be passed to chart server 425 where the visualized data set can be graphically laid out and linked together. Upon completion, chart server 425 can pass the graphically laid out and linked visualized data set to web server 420, which, in turn, can pass it on to client browser 410 being used by user 405. As a result, the visualized data set can be displayed to user 405.

Figure 5:
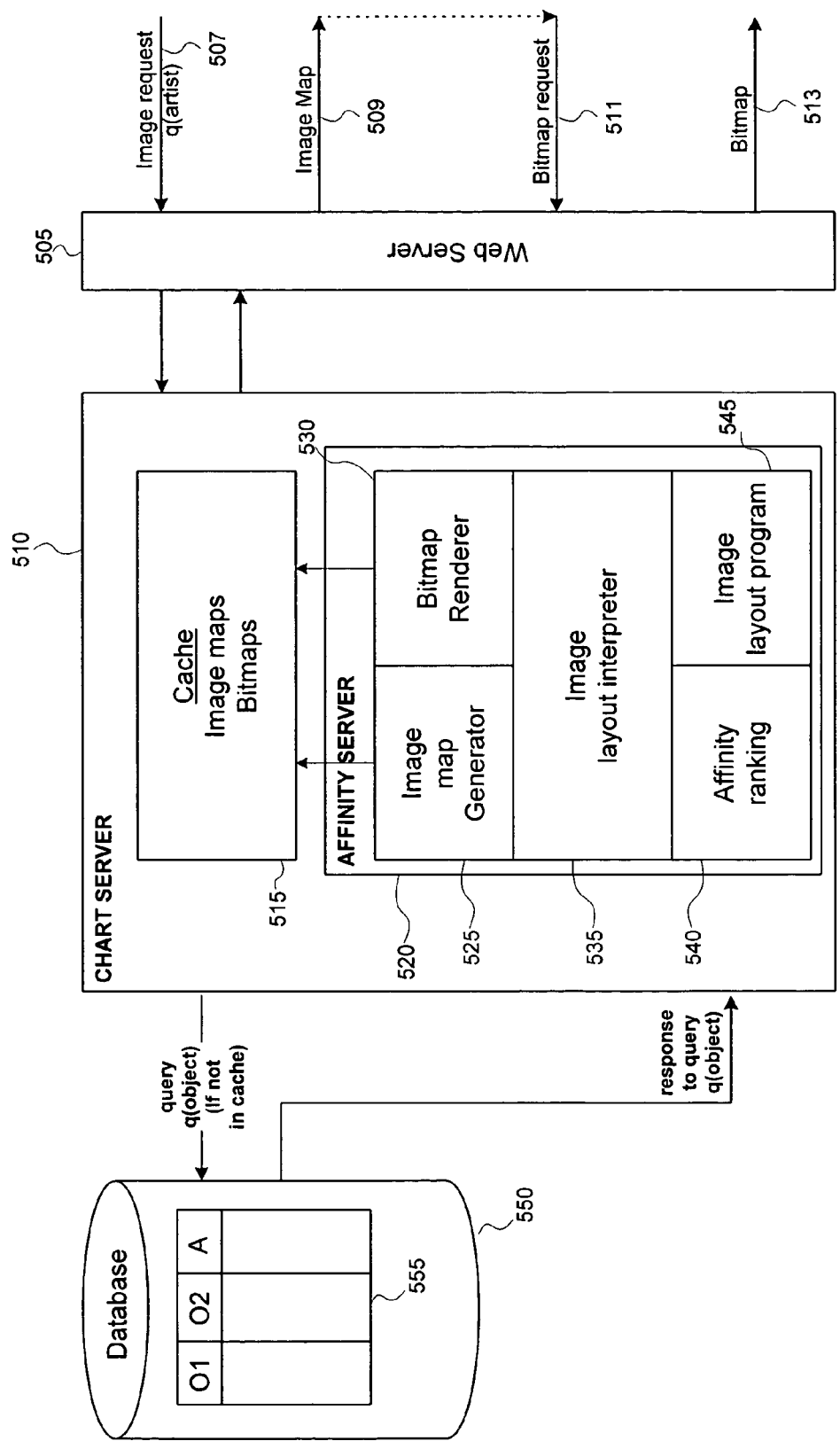
FIG. 5 depicts a system for visualizing large interrelated data sets.

FIG. 5 depicts an embodiment of a system according to the present invention for visualizing large interrelated data sets. As shown in FIG. 5, web server 505 can receive image request 507 for a particular artist. Upon determining that image request 507 is to generate a visualization of data from a data set, that request can be passed to chart server 510. Chart server 510 can then determine whether the necessary information to fulfill the request (i.e. the affinity chart) has already been calculated and cached. If so, image map 509 can be retrieved by chart server 510 from cache 515 and returned to web server 505 for display to the user. The retrieval of the bit map can then cause bitmap request 511, which can then be followed by the retrieval of the associated bitmaps from cache 515 and the display of bitmap 513 to the user.

If the information needed to fulfill the request has not been cached, chart server 510 can fulfill the request by retrieving information about the requested item from database 550. In particular, database 550 can contain data objects 555 that contain a distinct affinity value (A) between the requested item (O1) and each related item (O2). In response to a query by cache server 510, one or more data objects 555 for the requested item can be retrieved from database 550 and utilized by affinity server 520 to generate the necessary information (including, for example, image maps and bitmaps) for the selected item. Affinity server 520 can utilize an affinity ranking means 540 to rank the related items by their affinity values, and an image layout program 545 and image layout interpreter 535 to assemble the images. Affinity server 520 can also utilize image map generator 525 and bitmap renderer 530 to generate the actual image map and bitmaps. Once generated, the image map and bitmaps can be placed in cache 515 and transferred to web server 505. Web sever 505 can then present to the user the visualization of the interrelated data associated with the requested item.

Figure 6:
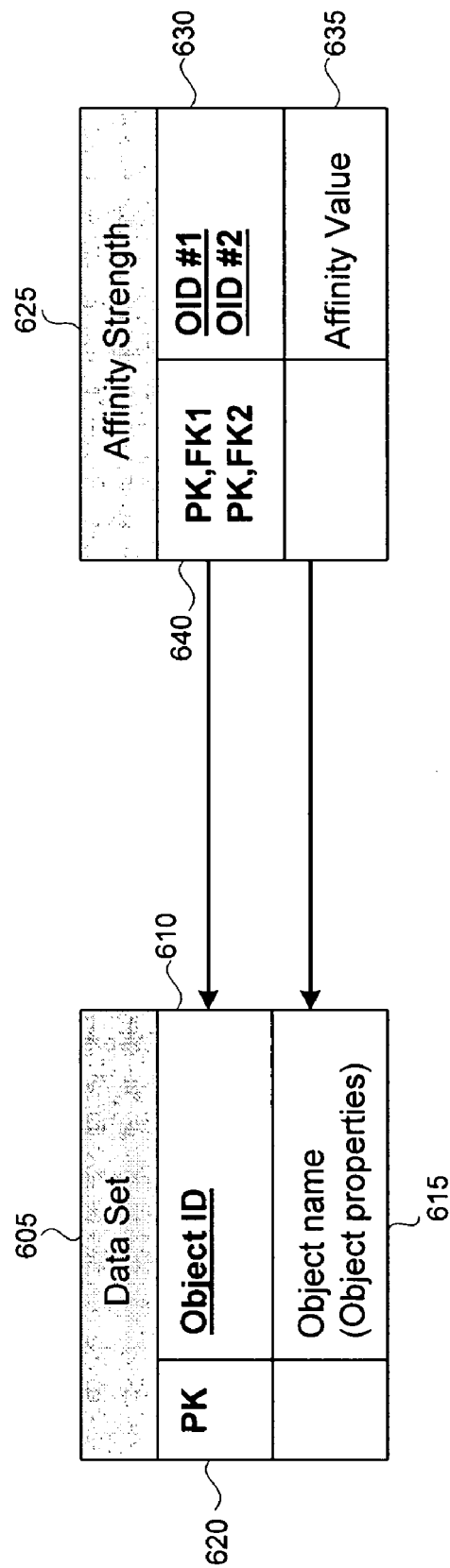
FIG. 6 illustrates a type of database structure that can be used as a source for the rankings used by a system visualizing large interrelated data sets.

FIG. 6 illustrates a type of database structure that can be utilized in the process of visualizing large interrelated data sets, according to an embodiment of the present invention. Within a particular data set, each item can be identified within a table 605 in a database by an object identifier (OID) 610 and an object name 615 (that may also contain object properties). The OID associated with each item is a primary key (PK) 620. Two OIDs from table 605 serve as primary key 620 for the affinity strength table 625. These two OIDs are labeled as foreign keys (e.g. FK1 and FK2 in field 640) of the second affinity strength table 625 within the database. Table 625 can be accessed by fixing the OID values to obtain the affinity value 635 between two items identified by their OIDs (e.g. OID #1 and OID #2 in field 630).

In an alternative embodiment, the information about the related items within the data set can be stored as an XML document with a document type descriptor (DTD) rather than in database tables. One example of a DTD for such an XML document could be:

```
<?xml version="1.0" encoding="UTF-8" standalone="yes"?>
<!DOCTYPE affinityChart [
    <!ELEMENT SIMILAR (ITEM,(LIST)*)>
    <!ELEMENT LIST (ITEM)+>
    <!ATTLIST LIST arm (upper|lower) "upper">
    <!ELEMENT ITEM (SEARCH,NAVIGATION)>
    <!ATTLIST ITEM type (principal|related) "related">
```

```
-continued

<!ELEMENT SEARCH (#PCDATA)>
<!ELEMENT NAVIGATION (#PCDATA)>
]>
```

Figure 7:
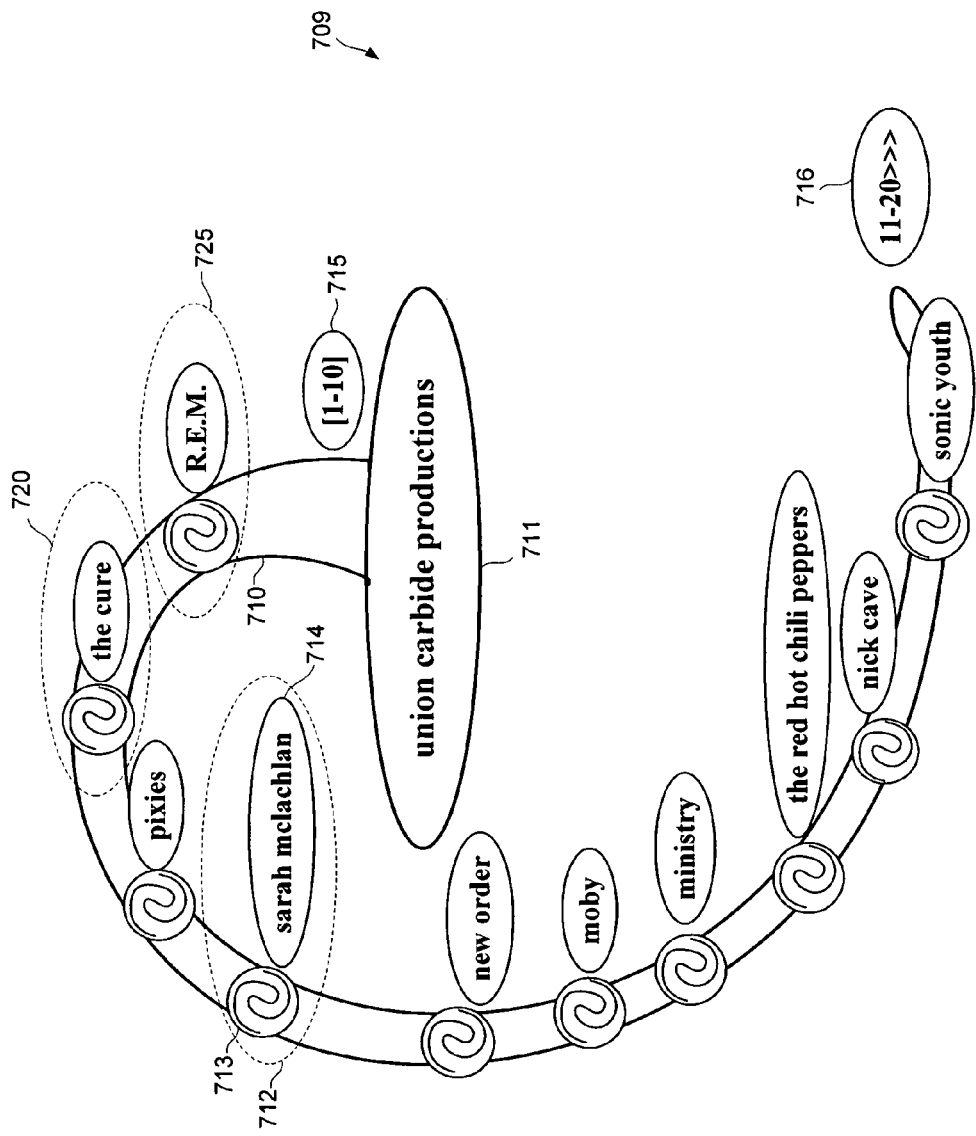
FIG. 7 is another affinity chart, according to the present invention.

Referring now to FIG. 7, there is shown a visualization of a data set of interrelated items, and further showing the most closely related items to a principal item 711, according to an embodiment of the present invention. In particular, FIG. 7 shows an affinity chart 709 including an affinity curve 710 having a principal item 711 and a plurality of related items 712. Each related item 712 can includes a navigational link 713 and a search link 714. Each navigational link 713 can permit a user to generate a new visualization of a data set of interrelated items related to its associated related item 712. Each search link 714 can permit a user to produce a page that has search results or additional information about the selected item. Adjacent to the principal item 711 and at one end of a selected string of related items 712 is a first sequence element 715, and adjacent to a last item of the selected string of related items 712 is a second sequence element 716, each of which provide a link to a supplementary affinity chart for either more or less remotely relevant strings of related items 712. In FIG. 7, principal item 711 is shown as "union carbide productions". This item represents a musical group. Related musical groups having varying levels of affinity to "union carbide productions" are shown as well. For example, while the related item 712 representing the musical entity "Sarah McLachlan" has an affinity to principal item 711, other related items (such as related item 720 representing the musical entity "the Cure" and related item 725 representing "R.E.M.") have a stronger affinity, as indicated by their closer proximity to principal item 711 on the curve. Similarly, still other related items may have a weaker affinity to principal item 711, as indicated by their further proximity from principal item 711 on the curve.

Figure 8:
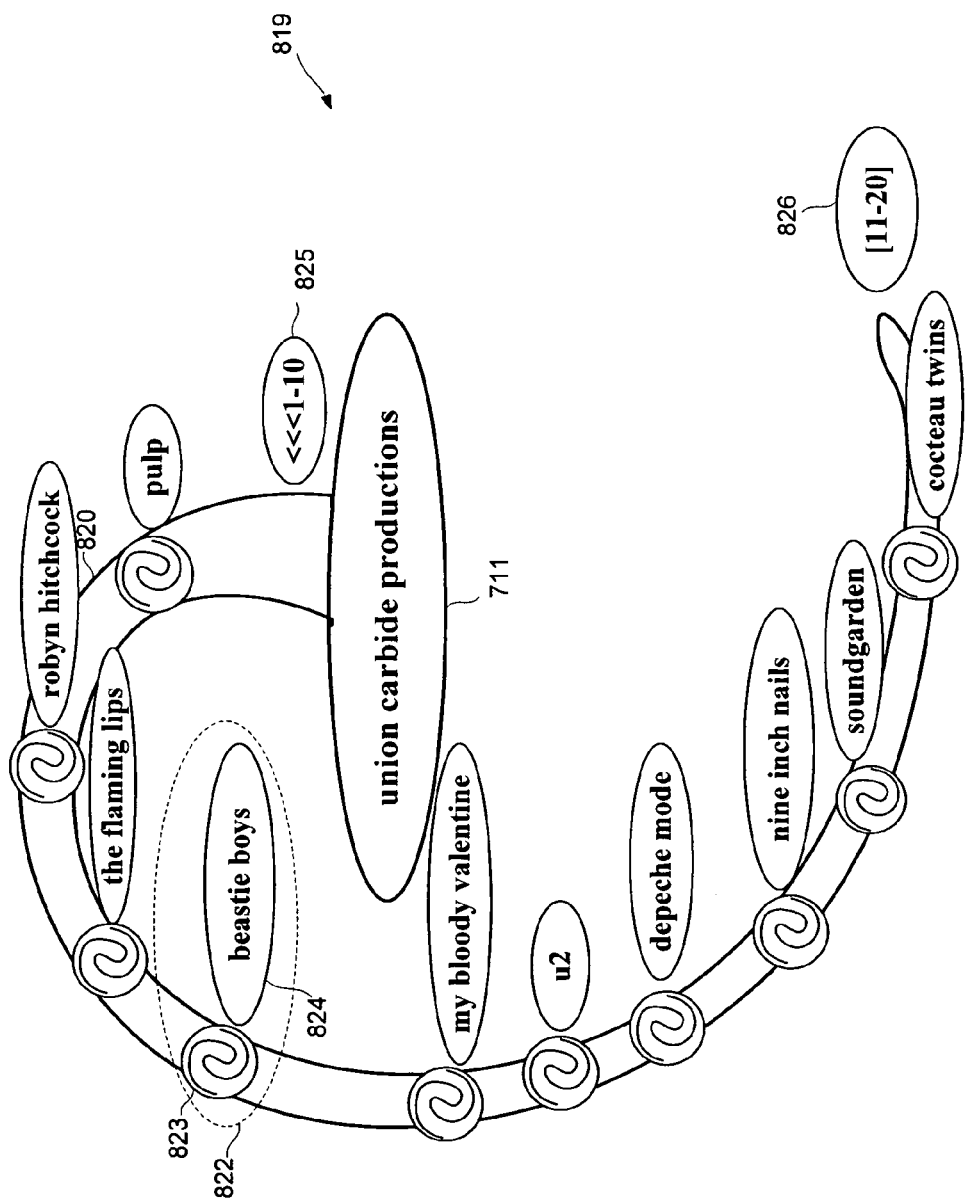
FIG. 8 is another affinity chart of other related items for the affinity chart of FIG. 7.

Referring now to FIG. 8, there is shown a diagram of other related items to the principal item in FIG. 7, according to the present invention. In particular, FIG. 8 shows an affinity chart 819 representing those items that would have been reached as a result of selecting first sequence element 715 in FIG. 7. In particular, FIG. 8 shows an affinity chart 819 including an affinity curve 820 including a principal item 711 and a plurality of related items 822. Each related item 822 includes a navigational link 823 and a search link 824. Adjacent to the principal item 711 and at one end of a selected string of related items 822 is a first sequence element 825, which provides a link to the affinity chart of more strongly related items, and adjacent to a last item of the selected string of related items 822 is a second sequence element 826 which provides a link to a supplementary affinity chart for more remotely relevant strings of related items 822. By selecting the first sequence element 826, the user can navigate to reach the affinity curve 710 to view a string of relevant items as shown in FIG. 7.

The methods and apparatuses of the present invention provide a visualization technique that allow a set of related data items to be represented with respect to their relationship to a principal data item. The set of related data items may be in any of several forms and the display of the related items eliminates duplication and information overload for the user. The related items may be displayed in many ways, including along curved segments or in list form, so as to allow convenient visualization of the data and the data's relationship to the principal item.

While the invention has been described in detail, including references to specific embodiments, it will be apparent to one skilled in the art that changes and modifications can be made to the invention without departing from the spirit and scope thereof. For example, while a particular embodiment related to musical artists has been disclosed, the invention can be applied equally as well for other data types. Thus, it is intended that the present invention cover the modifications and variations of this invention provided they come within the scope of the appended claims and their equivalents.

What is claimed is:

1. A method for providing graphic visualization of data sets containing a large number of items from said data sets, the method comprising:
    employing continuous curves including spiral segmentation in order to connect items relating to a primary item at different intensity levels;
    adjusting the graphic visualization to avoid information overlap and overload, the items related to said primary item grouped by strength of affinity;
    providing an affinity chart, and spacing each related item individually with each item placed in a non-overlapping position;
    presenting items with large numbers of related items with multiple affinity charts, and in the case of multiple affinity charts, providing a first affinity chart to visually represent a set of most strongly related items and providing next or subsequent related affinity charts to visually represent less strongly related items;
    using curves to represent a relationship of items related to a particular item positioned at a starting point for the curve, with distance along the curve representing a strength of affinity to the item at the starting point of the curve; and
    selectively employing color and shading gradations and curve thickness gradations are to emphasize the curve's role in conveying affinity strength, while placing items so they do not overlap or crowd each other.

* * * * *